US008452750B2

(12) United States Patent
Lawlor

(10) Patent No.: US 8,452,750 B2
(45) Date of Patent: May 28, 2013

(54) SYSTEM AND METHOD FOR THE CREATION AND ACCESS OF DYNAMIC COURSE CONTENT

(76) Inventor: Martin Edward Lawlor, Rochester, NY (US)

( * ) Notice: Subject to any disclaimer, the term of this patent is extended or adjusted under 35 U.S.C. 154(b) by 0 days.

(21) Appl. No.: 13/457,814

(22) Filed: Apr. 27, 2012

(65) Prior Publication Data

US 2012/0239648 A1    Sep. 20, 2012

Related U.S. Application Data

(63) Continuation of application No. 12/191,459, filed on Aug. 14, 2008, now Pat. No. 8,190,590.

(60) Provisional application No. 60/955,919, filed on Aug. 15, 2007.

(51) Int. Cl.
*G06F 17/30*    (2006.01)

(52) U.S. Cl.
USPC .......................................... 707/706; 707/791

(58) Field of Classification Search
None
See application file for complete search history.

(56) References Cited

U.S. PATENT DOCUMENTS

| 6,091,930 | A | 7/2000 | Mortimer et al. | |
|---|---|---|---|---|
| 2002/0188583 | A1 | 12/2002 | Rukavina et al. | |
| 2004/0205645 | A1* | 10/2004 | Hoffman ....................... | 715/530 |
| 2005/0091506 | A1 | 4/2005 | Miller et al. | |
| 2005/0287510 | A1* | 12/2005 | Sumrall et al. ................ | 434/353 |
| 2008/0070218 | A1* | 3/2008 | Ahl et al. ...................... | 434/322 |

OTHER PUBLICATIONS

Web page from Barron's in Education dated Nov. 4, 2008. http://www.profjournal.com/educators_reviews/barronsign_up_save.cfm. Author Unknown.
Email from Barron's Weekly Review dated Mar. 12, 2008. Author Unknown.
Web Pages from Business Week Education Resource Center dated Nov. 4, 2008. http://businessweek.juxtadigital.com. Author Unknown.
Web page from Izzit dated Nov. 4, 2008. www.Izzit.org/index.php. Author Unknown.
Email from Harvard Business Publishing dated Oct. 22, 2008. Author Unknown.
Web pages from HotChalk dated Nov. 4, 2008. http://www.hotchalk.com/index_new.html. Author Unknown.
Web pages from Ivey Publishing Casemate dated Nov. 4, 2008. http://cases.ivey.uwo.ca/Cases/Pages/home.aspx?. Author Unknown.
Web pages from The New York Times Website http://www.nytimes.com dated Nov. 4, 2008 entitled "Topic Pages to be Hub of New BusinessWeek Site" by Richard Perz-Pena.

* cited by examiner

*Primary Examiner* — Anteneh Girma
(74) *Attorney, Agent, or Firm* — Robert D. Gunderman, Jr.; Patent Technologies, LLC

(57) ABSTRACT

A computer based system and method for the creation and access of dynamic course content and associated media products is disclosed. The present invention utilizes dynamic current content sources such as news, web sources, blogs, podcasts, user generated content, and other sources to create media products such as slides, videos, audio and the like. The media products of the present invention are keyed to the static framework of the textbook or textbooks, and are searchable by textbook structure, media structure, key terms, date range, and the like.

16 Claims, 17 Drawing Sheets

Concepts: diversification; economies of scope and scale; strategic alliances; intensity of rivalry; overcapacity; capabilities and resources

Illustrates: the leverage that a huge actor like Wal-Mart has; the banking industry is concerned that Wal-Mart's highly touted efficiency and cost focus will drive down

SYSTEM AND METHOD FOR THE CREATION AND ACCESS OF DYNAMIC COURSE CONTENT

CROSS-REFERENCE TO RELATED PATENT APPLICATIONS

This application claims the benefit of the filing date of U.S. Provisional Patent Application No. 60/955,919 filed on Aug. 15, 2007, and is a continuation of U.S. Utility application Ser. No. 12/191,459 filed on Aug. 14, 2008.

BACKGROUND OF THE INVENTION

1. Field of the Invention

This invention relates generally to educational course content development, and more particularly to a computer based system and method for the creation and access of dynamic course content and associated media products.

2. Description of Related Art

Traditional courses that are taught in, for example, a college or university environment, often rely heavily on a textbook for course content. Over the years, many courses have been taught based on a chapter to chapter approach to learning. This approach has been proven to work well with static, and often times mature technical fields. With the continued growth in knowledge dissemination technologies driven by computers and networking, many fields of endeavor today change and evolve fairly quickly, leaving the static textbook model of course content development lacking current and timely information in addition, textbooks are still, largely bound and printed materials, which makes changes and updates difficult and costly. This disparity between the need for current and timely information and the static confines of traditional textbooks has forced many textbook publishers to add supplemental materials to their textbook offerings. These supplemental materials may include videos, slides, supplements and addenda, course packs, ancillaries, and other such add-ons. The offering of supplemental materials by textbook publishers, while an improvement over the static nature of the textbook itself, is still, however, static. Although publishers have begun to provide a number of online resources in the form of online quizzes and interactive flash cards, for example, these are targeted at students and for the most part still remain fixed in nature, and do not adequately address the need for fresh, dynamic material in course content development.

The addition of dynamic and current material to an otherwise static textbook approach to learning has been recognized by many innovative faculty members, professors, and course instructors. Not only does the addition of such dynamic and current material add to the overall learning experience, but the use of current, real world applications of theoretical course concepts also captures the interest and attention of students, making classroom time more effective and productive.

The task of locating, reviewing and using dynamic and current material in the development of course content has been relegated to those instructors who have the time, determination and energy to seek out relevant articles, news clippings, and other timely and current media information. Once appropriate content is found, it is often times out of date by the time a course is taught in subsequent quarters or semesters. This creates a burden on the instructor to continually seek out timely and relevant information for each upcoming class. The ongoing search for relevant and timely course content has in the past been very labor intensive, and as a result is often times not done with consistency and thoroughness.

It is therefore an object of the present invention to provide a system and method for the creation and access of dynamic course content. It is another object of the present invention to provide a system and method for the creation and access of dynamic course content that correlates the structure of a selected textbook with current content media information. It is another object of the present invention to provide a system and method for the creation and access of dynamic course content that correlates media products to current content. It is another object of the present invention to provide a system and method for the creation and access of dynamic course content that has a search function for finding media products based on user search criteria. It is yet another object of the present invention to provide a system and method for the creation and access of dynamic course content that can be accessed through a network. It is yet another object of the present invention to provide a system and method for the creation and access of dynamic course content that allows a user to download media products based on user defined search and selection criteria. It is another object of the present invention to provide a method for the creation of a dynamic course syllabus where current content is correlated to events in a course. These and other objects of the present invention will become evident to one skilled in the art after a review of this specification, claims, and the attached drawings.

BRIEF SUMMARY OF THE INVENTION

In accordance with the present invention, there is provided a system and method for the creation and access of dynamic course content having a computer program for correlating textbook structure data and course concepts with media products, a user interface for interaction with the computer program, a database of textbook structure data and course concepts operatively coupled to said computer program, at least one dynamic content source used in the creation of said media products, and a search utility.

The foregoing paragraph has been provided by way of introduction, and is not intended to limit the scope of this invention as defined by this specification, claims, and the attached drawings.

BRIEF DESCRIPTION OF THE DRAWINGS

The invention will be described by reference to the following drawings, in which like numerals refer to like elements, and in which:

FIG. 6 is a screenshot of one embodiment of the present invention showing a media search session by textbook structure;

FIG. 7 is a screenshot of one embodiment of the present invention showing a media search session by key term.

Figure 1:
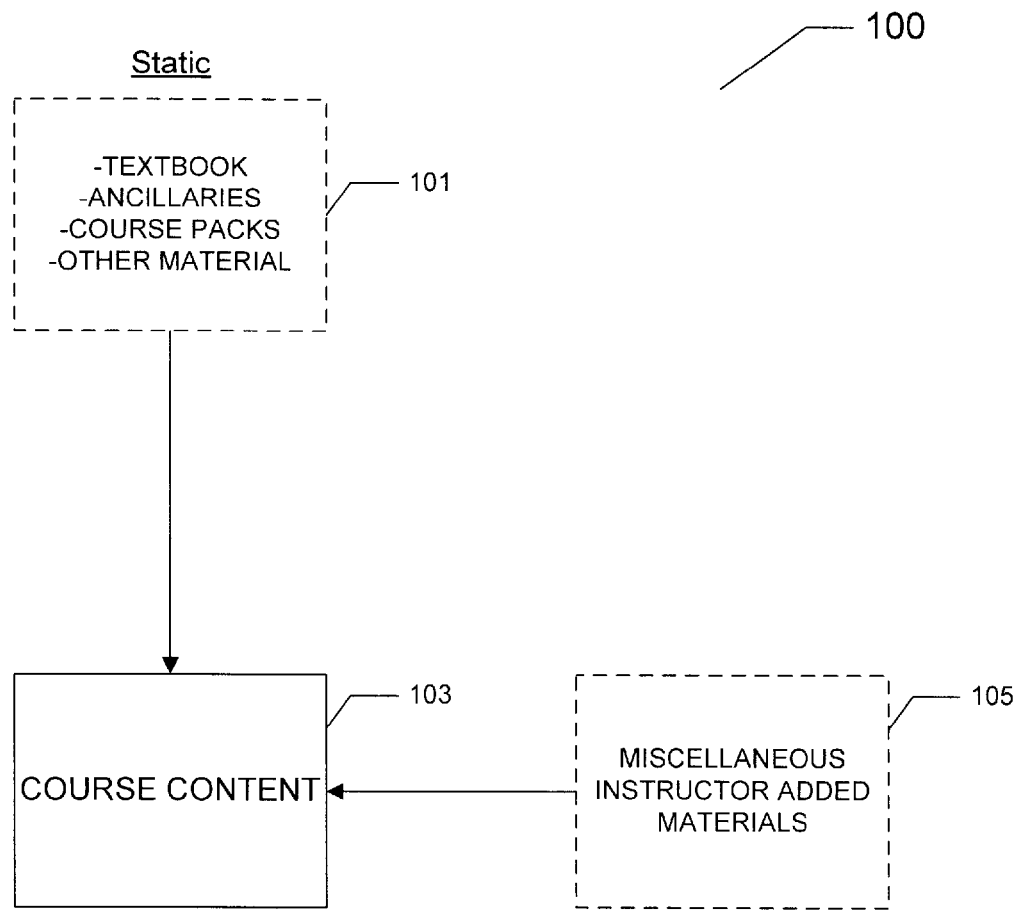
FIG. 1 is a diagram depicting a prior art approach to course content development.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by this specification, claims, and the attached drawings.

DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

For a general understanding of the present invention, reference is made to the drawings. In the drawings, like reference numerals have been used throughout to designate identical elements.

FIG. 1 is a diagram 100 depicting a prior art approach to course content development. A basic understanding of a common prior art approach to course content development will aid in understanding the present invention and its various embodiments thereof. Referring to FIG. 1, static material such as a textbook, as well as ancillaries, course packs, and other material, as shown in block 101, is often times used by an instructor, professor, faculty member, teacher, or other individual, to prepare course content for an upcoming course, seminar, class, session, lecture, or the like. The use of a textbook as the basis for course content has, in years past, been the de facto standard for course content development. The addition of instructor added materials 105 provides up-to-date, timely and custom course content to the static textbook baseline.

This need to supplement static materials continues to grow. As information exchange has become faster and more streamlined through progress in the communications arts (computers, television, video and audio sources, and the like), the textbook by itself for many disciplines has become mostly insufficient for course content development. Publishers of textbooks and others reacted by offering ancillary materials to supplement textbooks, course packs, and other material. This was all offered up to the individual preparing the course content 103. The disadvantage to such an approach is that this supplemental material is still primarily static in nature, and still does not represent timely, current real-world information. In addition, keeping these ancillary materials up to date is itself a chore.

The instructor, professor, faculty member, teacher, or other individual preparing the course content was driven to seek out supplemental, timely real-world materials. These miscellaneous instructor-added materials 105 were added to the course content 103 in an attempt to keep course content fresh, current, and interesting. There were also those instructors who would abandon the static textbook model altogether, and instead prepare course content strictly from materials located, gathered, and prepared by the instructor. Of course, the prior art processes described by way of FIG. 1 were, and still are, inefficient, time consuming, and in need of a better system for course content development.

Figure 2:
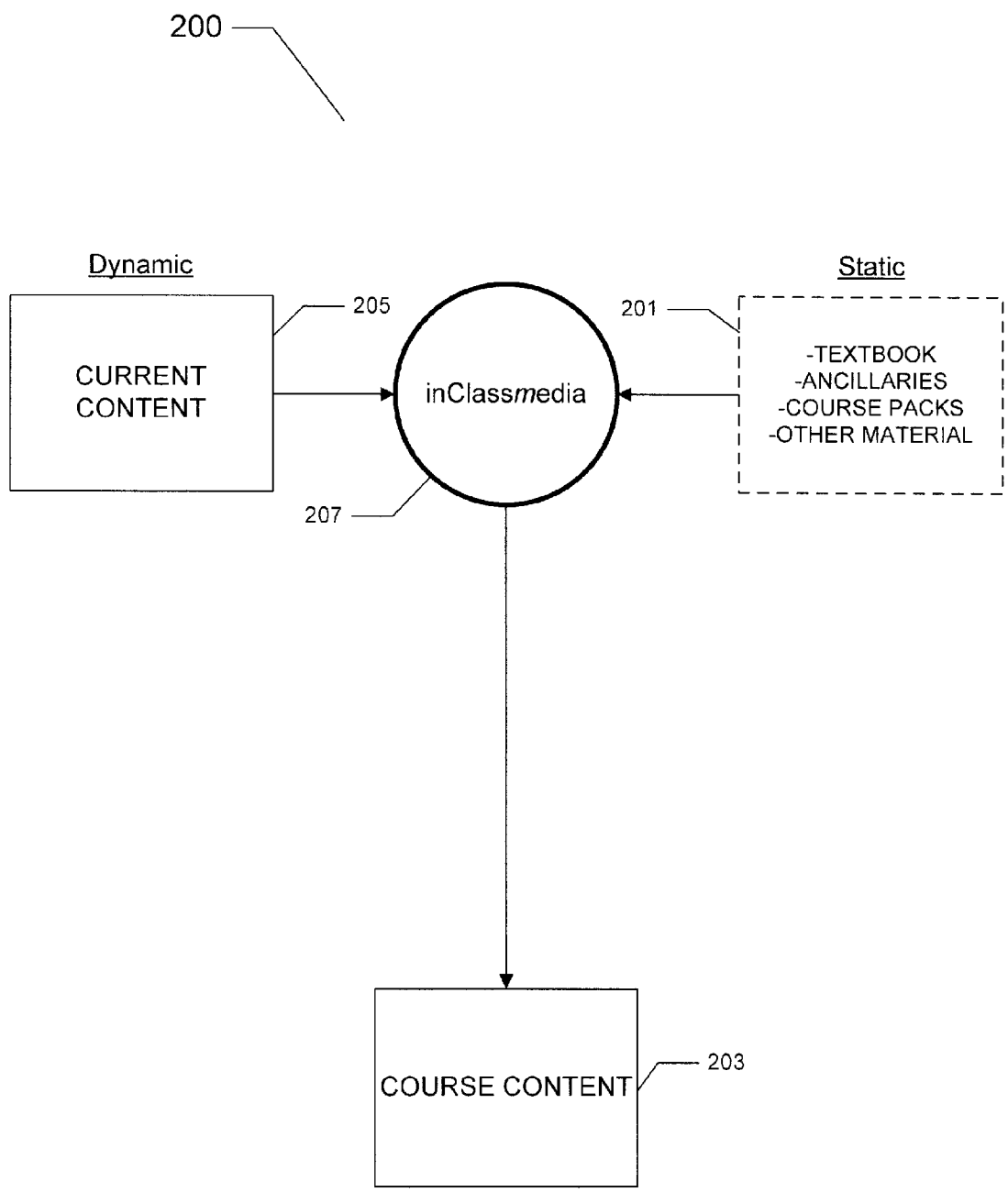
FIG. 2 is a top level block diagram of course content development using the system of the present invention.

Turning now to FIG. 2, a top level block diagram 200 of course content development using the system of the present invention is depicted. Static material 201 such as a textbook, ancillaries, course packs and other material is mapped to a computer program 207. The mapping uses the data relationships contained in the static material, such as title, chapter, author, publisher, ISBN number, year of publication, key terms, and the like. Current content 205, such as business news, web sources, podcasts, blogs, and user generated content, is also received by the computer program 207. The current content 205 is used, in some embodiments of the present invention, to generate media products (not shown in FIG. 2). The current content 205 is dynamic, and is updated on a regular basis either through the computer program 207, manually, or through an external mechanism. The mapping of static material 201 with dynamic current content 205 by way of the computer program 207 produces the useful and tangible output of course content 203. The course content 203 produced by way of the present invention is enriched over course content developed by prior art approaches such as those described in FIG. 1. The present invention further contains functional elements that are described by way of FIG. 3.

Figure 3:
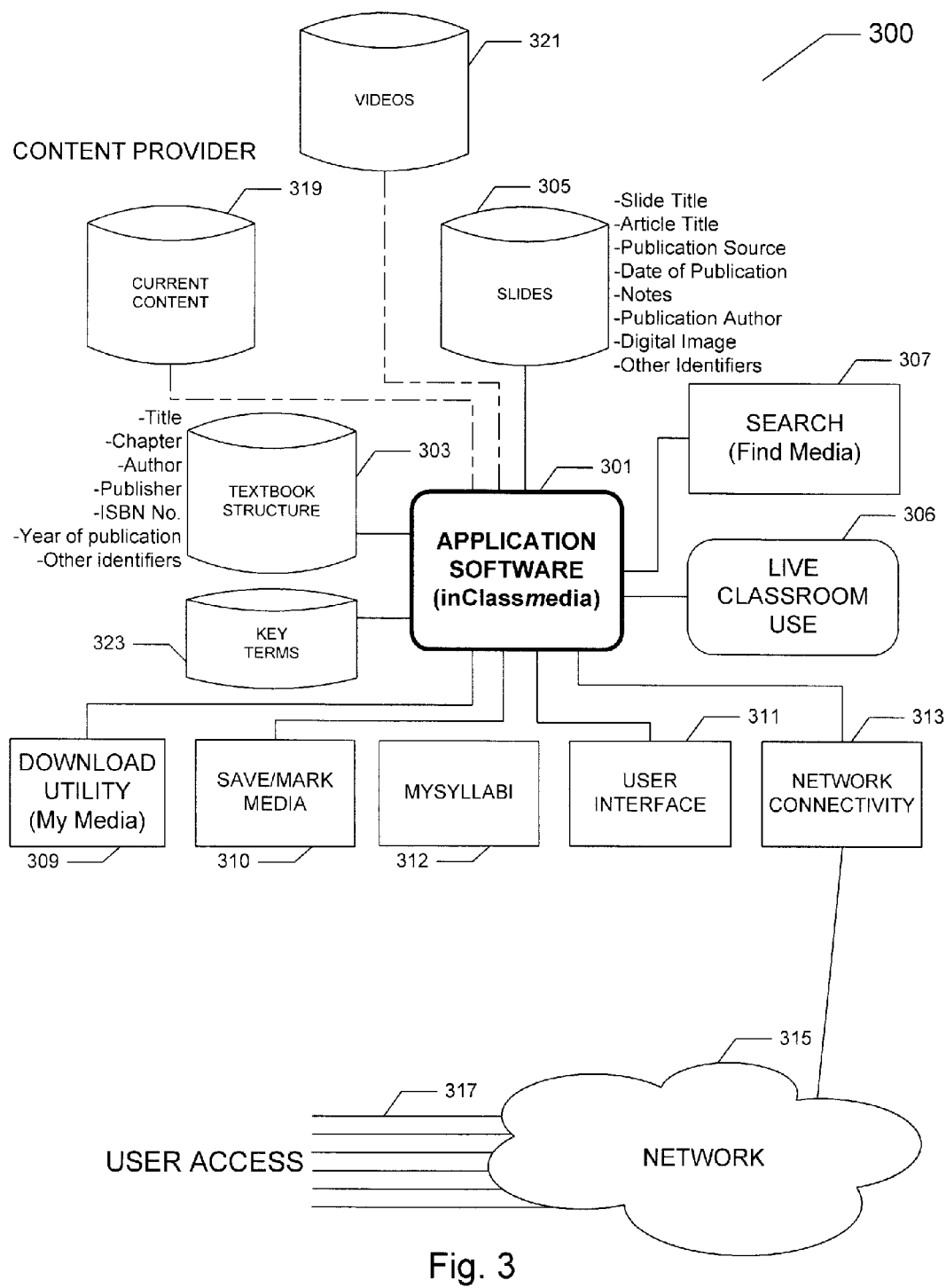
FIG. 3 is a functional block diagram depicting the various logical components of the present invention.
Figure 6:
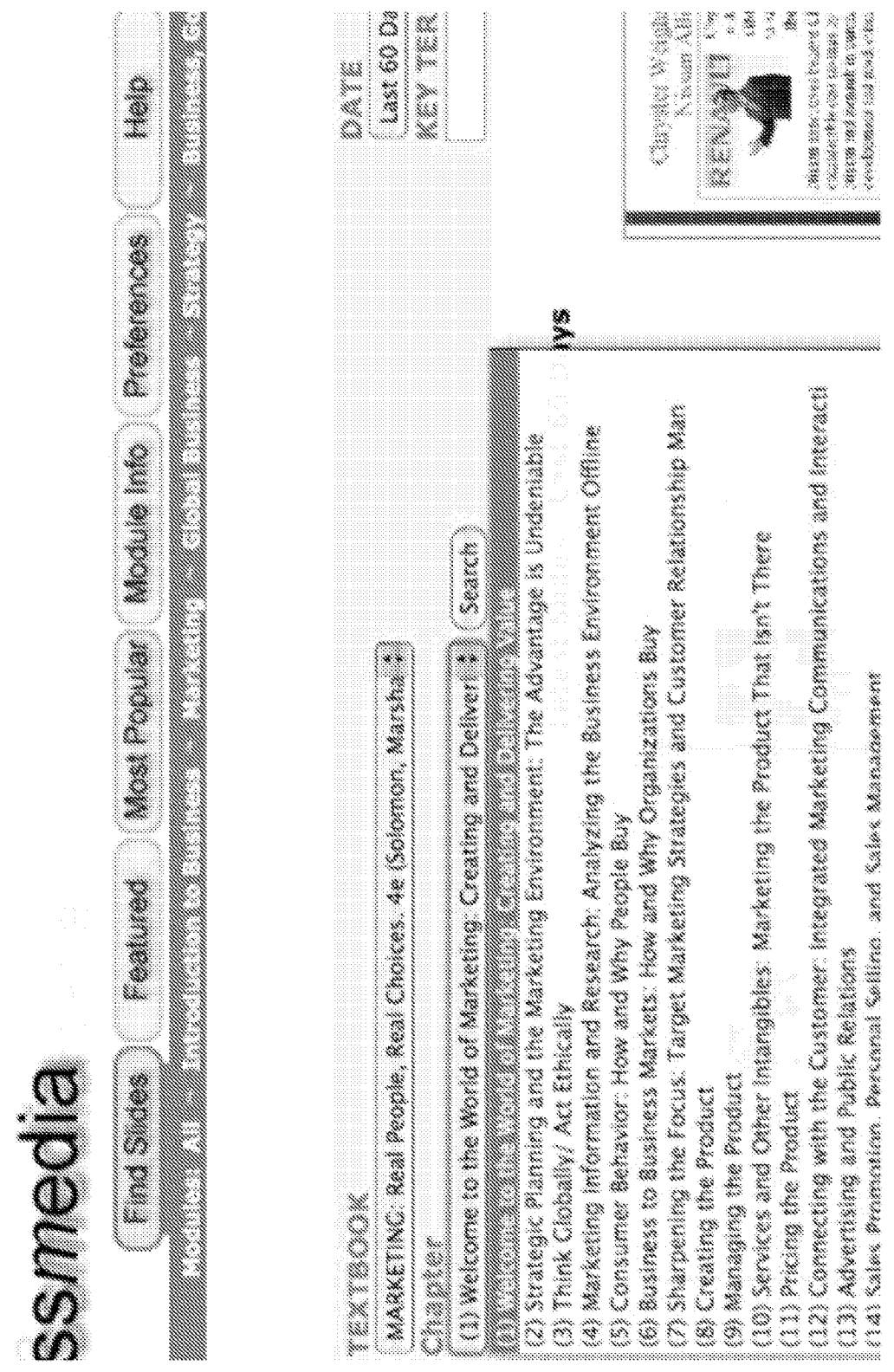
Figure 7:
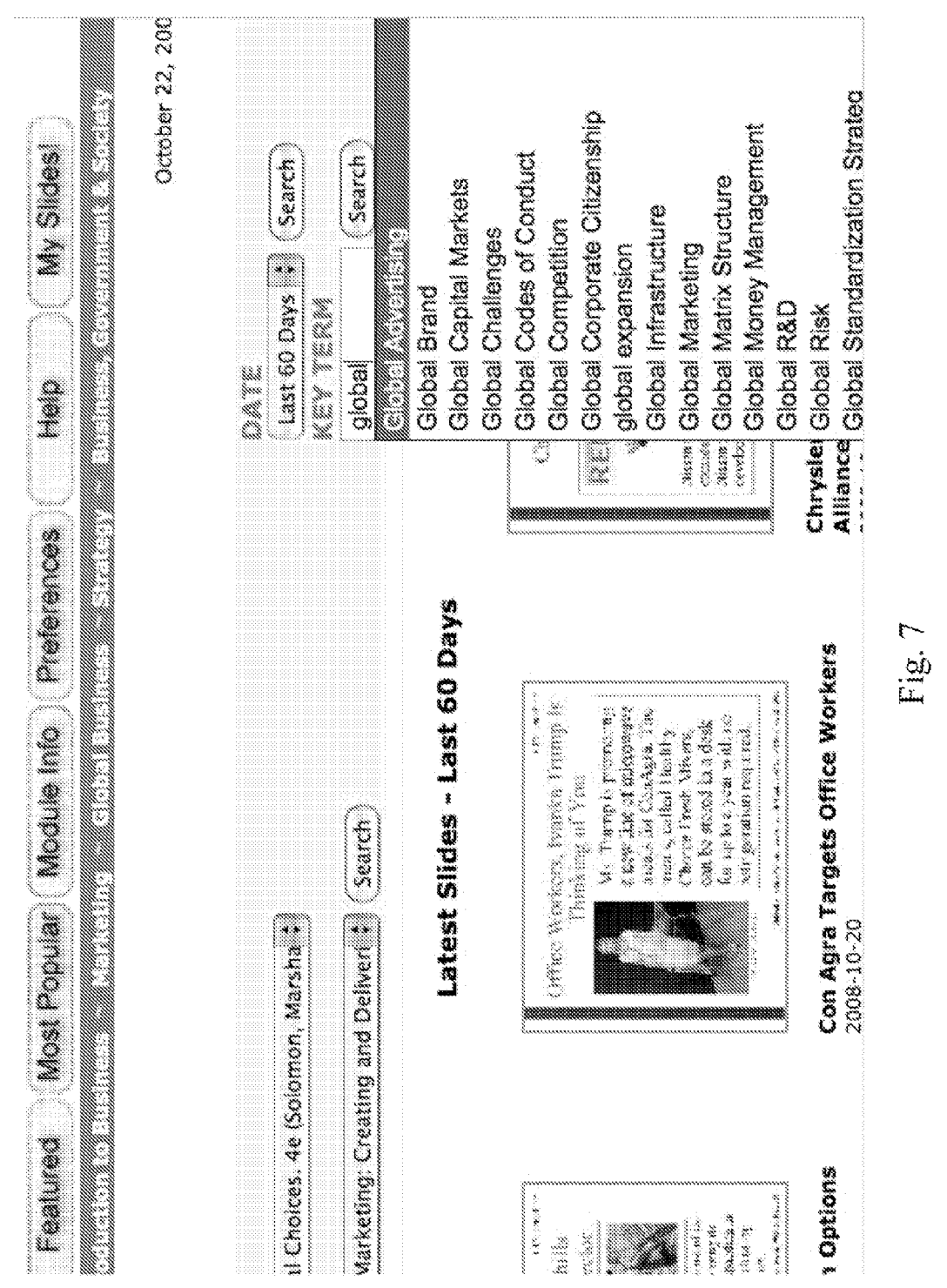
Figure 8:
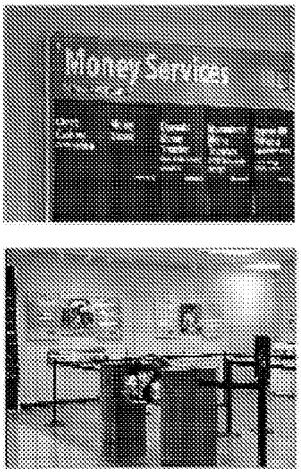
FIG. 8 is a screenshot of one embodiment of the present invention showing a media view following a media search session.

In FIG. 3, a functional block diagram 300 depicting the various logical components of the present invention is illustrated. The various logical components described are contained either in, or operatively coupled with, the application software 301. A database or other data schema containing textbook structure 303 is used to map or otherwise correlate key terms, course concepts and information contained in a static textbook or textbooks with media products and current content. This mapping or correlation facilitates ease of course content development and maintains the existing textbook-based foundation of many courses. The textbook structure 303 contains information such as, for example, title, chapter, author, publisher, ISBN number, year of publication, and other identifiers. Operatively coupled to the application software 301 is, in some embodiments of the present invention, a database or other data schema containing key terms 323. Key terms are words, phrases, course concepts, and other elements that may be used in conjunction with a search to aid a user in locating relevant and timely information that is suitable for their purposes. Also operatively coupled to the application software 301 is, in some embodiments of the present invention, current content 319 such as business news, web sources, podcasts, blogs, and user generated content. The current content 319 may be resident within the system of the present invention, or, in some embodiments, may be located on a separate system or systems and connected by way of networking techniques that are known to those skilled in the art. In addition to current content 319, in some embodiments of the present invention videos 321 may be operatively coupled to the application software 301. The videos 321 may be resident within the system of the present invention, or, in some embodiments, may be located on a separate system or systems and connected by way of networking techniques that are known to those skilled in the art. A database or other data schema containing slides 305 and the structure of the slides is also operatively coupled to the application software 301. The slides may be, for example, Microsoft PowerPoint™ formatted slides, Apple Keynote™ slides, and the like. The structure of the slides may include, for example, slide title, article title, publication source, date of publication, notes, publication author, digital image, and other identifiers. The slides 305 are compiled based on current content, and may include, for example, summaries of current content articles and news stories. The slides 305 are updated regularly, and are accessible through the application software 301. The slides 305 are used to supplement static content in the preparation of course content, and are searchable by way of the slide structure elements, key terms, relationship to textbook structure, and the like. A search utility 307 is also coupled to the application software 301, and provides a user with a multitude of search options designed to efficiently locate and download relevant and timely dynamic course content. Such utility is of paramount importance in the preparation of course content where relevant and timely information adds value and interest to a class, course, seminar, and the like. Searches using the search utility 307 may look for key terms, textbook structure, key elements in the slides, current content, videos, and other media products. In addition, full text searching may be performed where all media is searched for a selected term or phrase. As part of the search utility 307, users will be able to filter their search results in a number of ways, for example, by date, media type, major subject, and the like. A user may, in certain situations, desire to run or otherwise display the media through live classroom use 306. This allows the user to directly use the media in a classroom setting without the need to download the media. An appropriate software player may be used depending on the nature of the media (video, audio, presentation slides, text, and the like). The application software 301 also, in some embodiments of the present invention, has network connectivity 313 by way of a network 315 and user access 317. Such network connectivity may include, for example, the internet, a local area network, a private network, a virtual private network, an optical network, a radio communications network, and the like. The system of the present invention also has a user interface 311 to allow a user to interact with the various functions of the application software such as search, download, browse, and the like. FIGS. 6, 7, and 8 depict an example of several screens of the user interface of the present invention. Also coupled to the application software 301 is a download utility 309 that allows a user to transfer media products such as slides, video, audio and the like. Download of media and other data is optional, and often at the discretion of the user. The user, in some embodiments of the present invention, may preview and then select desired media products, place them in a temporary storage location such as a virtual shopping cart, and then check out with the selected items using the download utility 309. Payment processing may include credit card, fixed monthly, quarterly or periodic fees, and the like. If the user does not wish to download media or information, but wishes to flag the media for future reference, a save/mark media function 310 can be used. The save/mark media function 310 allows a user to mark media using a checkbox, highlighting, or the like. In addition, in some embodiments of the present invention, the media can be saved in a temporary location such as a folder, an album, or the like. The user can also use the saved or marked media without downloading by running the media by way of a network connection.

Continuing to refer to FIG. 3, the MySyllabi function 312 is a customization feature that allows users to map the textbook and chapters to specific weeks (e.g., week 1, week 2 . . . week 8). This allows the system to then "suggest" media for review or playback in specific weeks of the course. The syllabus is the organizing focus of all courses. As part of the syllabus, instructors include a weekly schedule of readings and assignments. So, for example, students might need to read chapters 1 and 2 in week chapter 3 in week 2 and so On. This provides a great opportunity to suggest media to instructors based on their syllabus textbook reading assignments. MySyllabi is a customization option that allows instructors to map a textbook and specific chapters to weeks in the semester or quarter. From that, the system presearches new slides and video and suggests them to the instructor. Course Instructors will need to create a mapped textbook syllabus in New Syllabus Setup and perform the following:

Select textbook from dropdown list
    Map specific chapters to specific weeks
    Name syllabus
    Date of syllabus (actual date, semester/quarter/year)
    Copy syllabus (for next time they teach this course. Optional)
    Assign specific slides/videos/media from suggested media to specific weeks (optional). This should include drag and drop capabilities.

A flowchart depicting the interaction of a user with the MySyllabi functionality can be referred to in FIG. 9, a description of which is provided later in this specification.

By way of example, and not limitation. Use Cases for the Application Software (INCLASSMEDIA) 301 are as follows:

| | Description | What a user sees and is able to do |
|---|---|---|
| 1 | Login | This is the page the user comes to when they go to www.inclassmedia.com. They can either: Sign-in with a username and password which takes them to the default/home page or Register for the first time. They will see some thumbnails with the option to see an enlarged image. They should also see a streaming video or animated explanation of what inclassmedia allows them to do. |
| 2 | Default/Home Page | This is the page users come to once they've signed in. They see rows of thumbnail images in LIFO order representing either slides or videos that they can preview or mark for some further action. They see several SEARCH options Textbook/chapter search: Key term/full text search: They see several tabs at top of page: Saved Media (or myMedia) mySyllabus |
| 3 | Thumbnail Actions | Thumbnails represent slides, videos, or other media (e.g., podcasts). Users can Mouseover the thumbnail to see the notes section of the slide or the description of the streaming video or other media. Left click on the slide to see full slide or to launch a player to preview the video or other media. |

-continued

| | Description | What a user sees and is able to do |
|---|---|---|
| | | Add the media to user's saved media (myMedia); users should be able to add by dragging the thumbnail to the saved media tab or by clicking a plus or add button. Add the media directly to a specific virtual presentation (Week 1, Pricing, etc.) Remove the media from user's saved media Rate the media |
| 4 | SEARCH Actions | Users have several search options: Textbook/chapter search: where they can select their textbooks from a dropdown box and then select the chapter to search. Key term/full text search: this is a suggestible search for terms that would appear in textbooks. Users can also search for any other term (e.g., Starbucks, China). Users should be able to filter results by Date (e.g., last week, month, 6 months, year) Media type: slide, video, podcast/mp3, etc. Major subject (e.g. Marketing, Strategy, Global Business, etc.) |
| 5 | Registration | There should be several registration options: Simple registration: First name Last name Email address Password School (database/lookup) Instructor status Fulltime Adjunct Customize Profile Primary Subject Interest Marketing Strategy Global Business Introduction to Business Organizational Behavior MIS Finance Accounting Other Notification Options Email alerts when new material is added to INCLASSMEDIA (when and how often) |
| 6 | Sign-in | Sign-in requests username and password. Also optionally authentication. Schools whose libraries have subscribed to full text database services check authentication before allowing click-thru to content provider database via proxy server. If on campus, instructor gets passed through automatically (for example, check IP address of machine on campus or domain name): if off-campus, users are asked to input college userid and password. |
| 7 | Saved Media (myMedia) | Users will be given storage space on server to save selected media. They will access this from tab on top of page or link on page. Users will save media after browsing thumbnails, with option to save them from thumbnail image or from full slide or streaming video view. Saved media space has organizing functionality offering several views. Over time users can save many slides, videos, and other media (or pointers to those). These are presented to users as thumbnail views in LIFO order similar to the default/home page view. Users primarily will want to Preview slides, videos, and other media to decide if they should use them in class Organize media into virtual presentations for classroom playback/viewing. For example, selecting 3 or 4 slides in a particular order to "play" in class Name the virtual presentations (e.g., Week 2, Pricing, etc.) Remove them from saved media storage (i.e., un mark them) If they have many saved slides, they will want to search through them using the same search options as they have with the larger database of media. |

-continued

| | Description | What a user sees and is able to do |
|---|---|---|
| 8 | mySyllabus | The syllabus is the organizing focus of all courses. As part of the syllabus, instructors include a weekly schedule of readings and assignments. So, for example, students might need to read chapters 1 and 2 in week 1, chapter 3 in week 2 and so on. This provides a great opportunity to suggest media to instructors based on their syllabus textbook reading assignments. mySyllabus is a customization option that allows instructors to map a textbook and specific chapters to weeks in the semester or quarter. From that, the system presearches new slides, videos, and other media, and suggests them to the instructor. Instructors will need to create a mapped textbook syllabus in:<br>New Syllabus Setup:<br>Select textbook from dropdown list<br>Map specific chapters to specific weeks<br>Name syllabus<br>Date of syllabus (actual date, semester/quarter/year)<br>Copy syllabus (for next time they teach this course)<br>Associate specific slides/videos/media from suggested media to specific events such as virtual presentations, specific weeks, etc.. This should include drag and drop capabilities. |
| 9 | Admin | Admin comprises a number of activities:<br>a. Add Media/Edit Media<br>b. Add/Edit Topics<br>c. Add/Edit Key terms<br>d. Add/Edit Source Publications<br>e. Add/Edit Textbooks<br>f. Add/Edit Users<br>g. Add/Edit Schools<br>h. Reports/Analytics |
| 9a | Add Media/Edit Media | Add media. Need to upload media to server and define it for the system. Media will have a number of fields that define it:<br>Title<br>Type<br>Source (journal/publication name)<br>Date (publication date)<br>Date entered into the system<br>Key terms<br>Topics (topics are a higher-level hierarchical level in the database schema). All key terms when they get entered in the system need to be associated with one or more topics.<br>Illustrates. A field in the notes section of slides or added as description with video and other media to tell the instructor why this is relevant. Instructor can use this verbatim in discussing the media in class.<br>Article Context: this is also part of the notes section of the slides.<br>Link to full text article. This is what the library calls a "persistent link" or a URL that gets passed through the library's proxy server directly to the content provider's database to pop the full text of the article in another browser window.<br>Image (such as jpeg) for the thumbnail. |
| 9b | Add/Edit Topics | Topics are high-level business concepts that include many key terms. They tend to be equivalent in many cases to chapter headings (e.g., Pricing, Distribution, Advertising. etc). their primary purpose is to better manage thousands of key terms. For example, when adding key terms to a particular slide, it is easier to select key terms from a shorter more relevant list associated with a topic (Pricing, for example, which might include a list of 30 key terms), rather than from the entire list of thousands of key terms.<br>Key terms are associated with at least one topic |
| 9c | Add/Edit Key Terms | When media get added to the database, they are assigned key terms. These terms are searchable and correspond to terms of the same name that are entered in the database when textbooks are added. (Terms are added to chapters during the textbook input process.)<br>This is a key concept in the ICM value proposition and allows instructors to find very relevant media. It also allows the system to suggest media in mySyllabus (above).<br>The easiest way to add new key terms is to have the system recognize them when a slide is uploaded to the database. If the |

| | Description | What a user sees and is able to do |
|---|---|---|
| | | key term already exists (i.e., it was added during textbook setup or manually earlier), fine; if not the system flags this as a new key term and requires that the admin associate the term with a topic and textbook chapter. |
| 9d | Add/Edit Source Publications | Each slide is derived so to speak from an article in the business press (Wall St. Journal, New York Times, The Economist, etc.). When slide is created, admin needs to associate it with a source publication.<br>Users might search for media based on this source.<br>Slide shows source attribution at bottom of every slide.<br>Admin also enters publication date. |
| 9e | Add/Edit Textbooks | Users have the option to search for media by selecting a textbook and chapter from a drop down list.<br>Textbook creation or input includes:<br>Adding/Deleting Textbook Information<br>Textbook title<br>Textbook authors<br>Textbook publisher<br>Textbook edition<br>Adding/associating Chapters with textbooks<br>Chapter title<br>Chapter number<br>Assigning Key Words<br>Editing Chapters<br>Adding or deleting key words<br>Changing chapter titles or numbers (not likely unless mistake) |
| 9f | Add/Edit Users | Users will be automatically added during the registration process.<br>Admin will need to add users or deny access, or review and modify user information, i.e., admin access to user data.<br>Customer data will be available for reports and analysis |
| 9g | Add/Edit Schools | Registration requires inputting of college/university. This is best done through a drop down list.<br>Admin will enter or edit this list. |
| 9h | Reports/Analytics | Number of users<br>Number of media<br>Media Usage<br>Most popular<br>Usage by media type<br>Usage by school<br>Usage by users<br>Usage by primary subject area<br>Usage by date (day, week, month)<br>Saved Media (myMedia)<br>Number of saved media accounts<br>Number of media saved<br>Number of mySyllabus accounts<br>Number of virtual presentations<br>Searches by<br>Textbook/Chapter<br>Key terms<br>Other full text terms<br>Most popular search terms |

Figure 4:
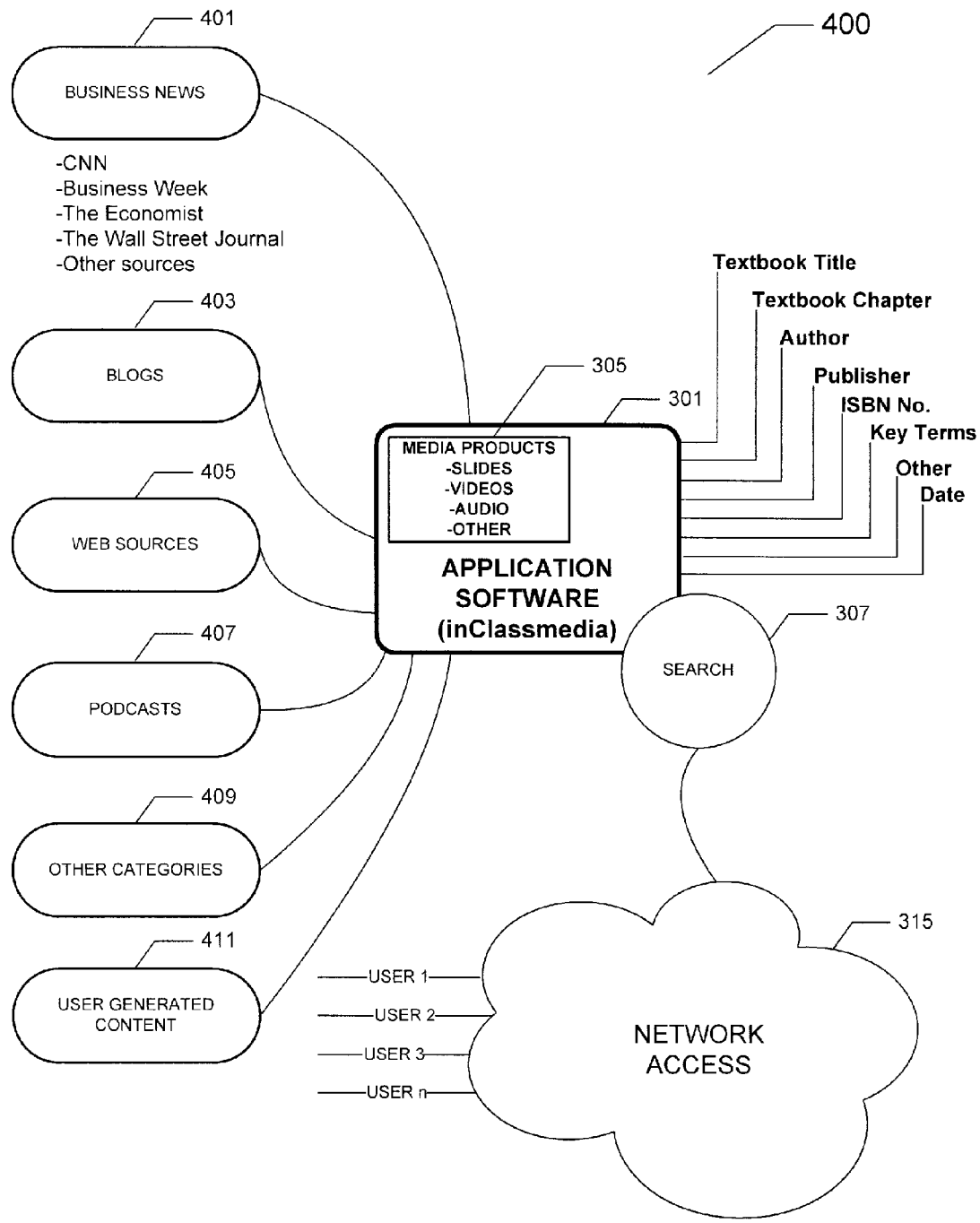
FIG. 4 is a top level data access diagram of the present invention.

Turning now to FIG. 4, a top level data access diagram 400 of the present invention is shown. The application software 301 delivers various media products 305 such as slides, videos, audio, and the like by mapping static textbook structures to current dynamic content. Current content used to create the media products includes, for example, business news 401 (with sources such as CNN, Business Week, The Economist, The Wall Street Journal, and the like), blogs 403, web sources 405, podcasts 407, other categories 409, and user generated content 411. The application software 301 may also provide, in some embodiments of the present invention, access to current content directly or through an intermediary provider, system or network. The media products 305 are often based on current content, and may be created by individuals and placed on or within the application software 301, or may be created by users themselves, or may further be created by way of software or a combination of software and individual or group efforts. The media products 305 may also, in some embodiments of the present invention, be procured from third parties or content providers. The application software is searchable using search 307 and network access 315 techniques. The search may look for key terms, textbook structure, key elements in the slides, current content, videos, and other media products. In addition, full text searching may be performed where all media is searched for a selected term. As part of the search utility 307, users will be able to filter their search results in a number of ways, for example, by date, media type, major subject, and the like. Network access 315 may include, for example, the internet, a local area network, a private network, a virtual private network, an optical network, a radio communications network, and the like.

Figure 5:
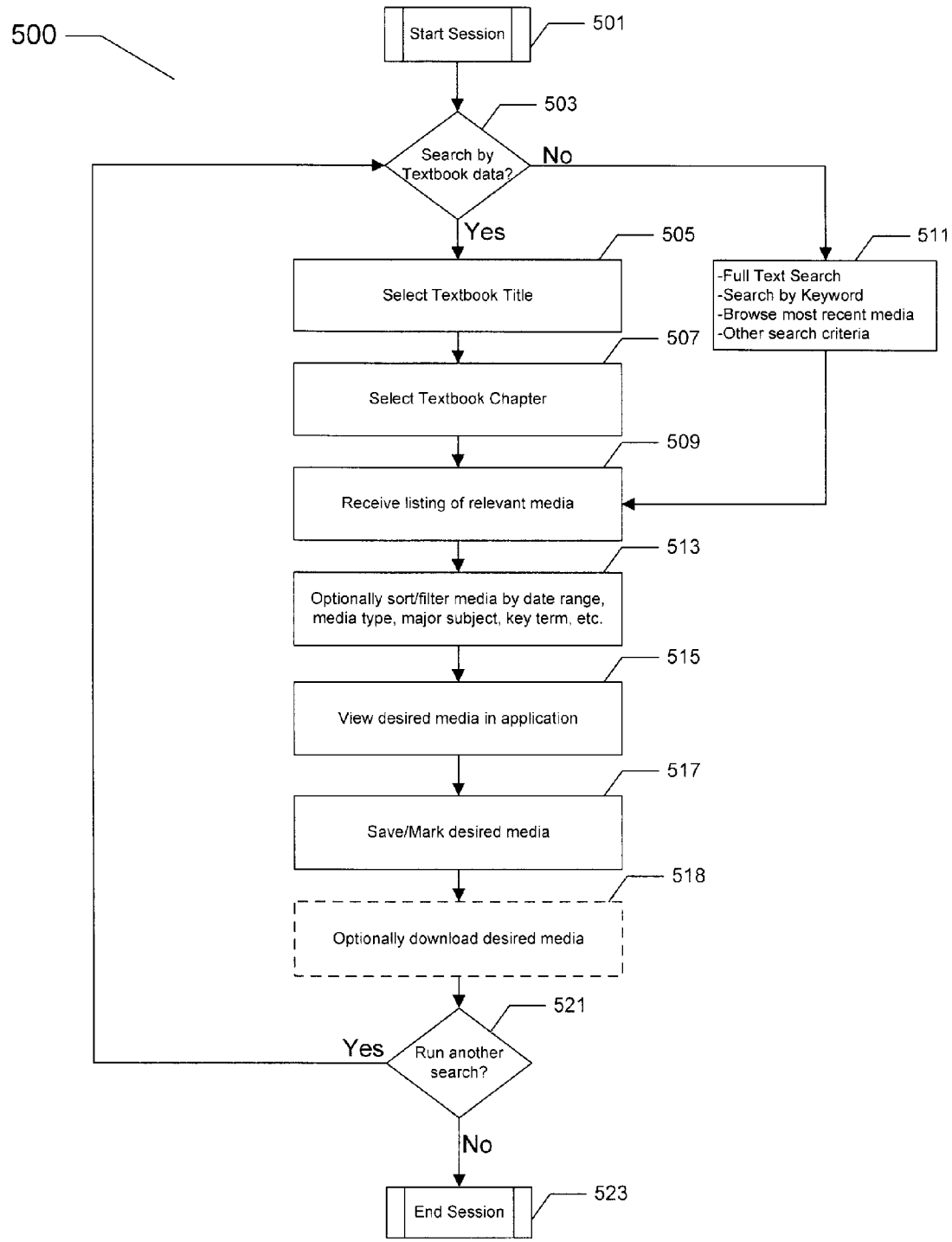
FIG. 5 is a flowchart depicting a typical user session of the present invention.

Turning now to FIG. 5, a flowchart 500 can be seen that depicts a typical user session of the present invention. At the start of the session 501, a user is prompted to search by textbook data in decision 503. If the user does not desire to search by textbook data, they may in step 511 perform a full text search, search by keyword, browse most recent media, or select other search criteria. Once their search is completed in step 511, they will receive a listing of relevant media in step 509, have the ability to optionally sort the media by date range, media type, major subject, key term, etc. in step 513. In step 515, they will view the desired media in the application, and in step 517, the user will save or mark the desired media, or optionally download the media in step 518. If no media is saved, marked or downloaded in steps 517 or 518, the user can run another search in step 521. Similarly, once the desired media is saved, marked or downloaded in steps 517 or 518, the user can also run another search in step 521. If, in decision 503, the user desires to search by textbook data, they may select the textbook title in step 505, select the textbook chapter in step 507, and receive a listing of relevant media in step 509. The user also has the ability to optionally sort the media by date range, key term, etc. in step 513. In step 515, they will view the desired media in the application, and in steps 517 or 518, the user will save, mark or download the desired media. If no media is saved, marked or downloaded in steps 517 or 518, the user can run another search in decision step 521. Similarly, once the desired media is saved, marked or downloaded in steps 517 or 518, the user can also run another search in step 521. To terminate the process, if another search is not elected in decision step 521, the session is ended in step 523. The steps described by way of FIG. 5 are by example, and not limitation. Other similar and additional steps may be known to those skilled in the art, and are not intended to be a departure from the fundamental attributes of the present invention as defined herein.

Turning now to FIGS. 6, 7, and 8, several screen shots of one embodiment of the present invention are depicted.

FIG. 6 shows a media search session by textbook structure. As can be seen, a textbook title is selected from a drop down list, and the chapters of the selected textbook also appear in a drop down list. The user may search for media products such as slides that are mapped to the selected title and chapter of the textbook selected. A preview of each of the media products is then displayed, as can be seen in FIG. 6, and the user can select the desired media products for retention and subsequent download. As seen in FIG. 6, a search may also include date range and or key terms.

FIG. 7 further depicts a media search session with a drop down list of key terms displayed.

FIG. 8 depicts a media view following a media search session. A close up of the selected media, in this example slides, is shown along with a notes field at the bottom of the slide.

Figure 9:
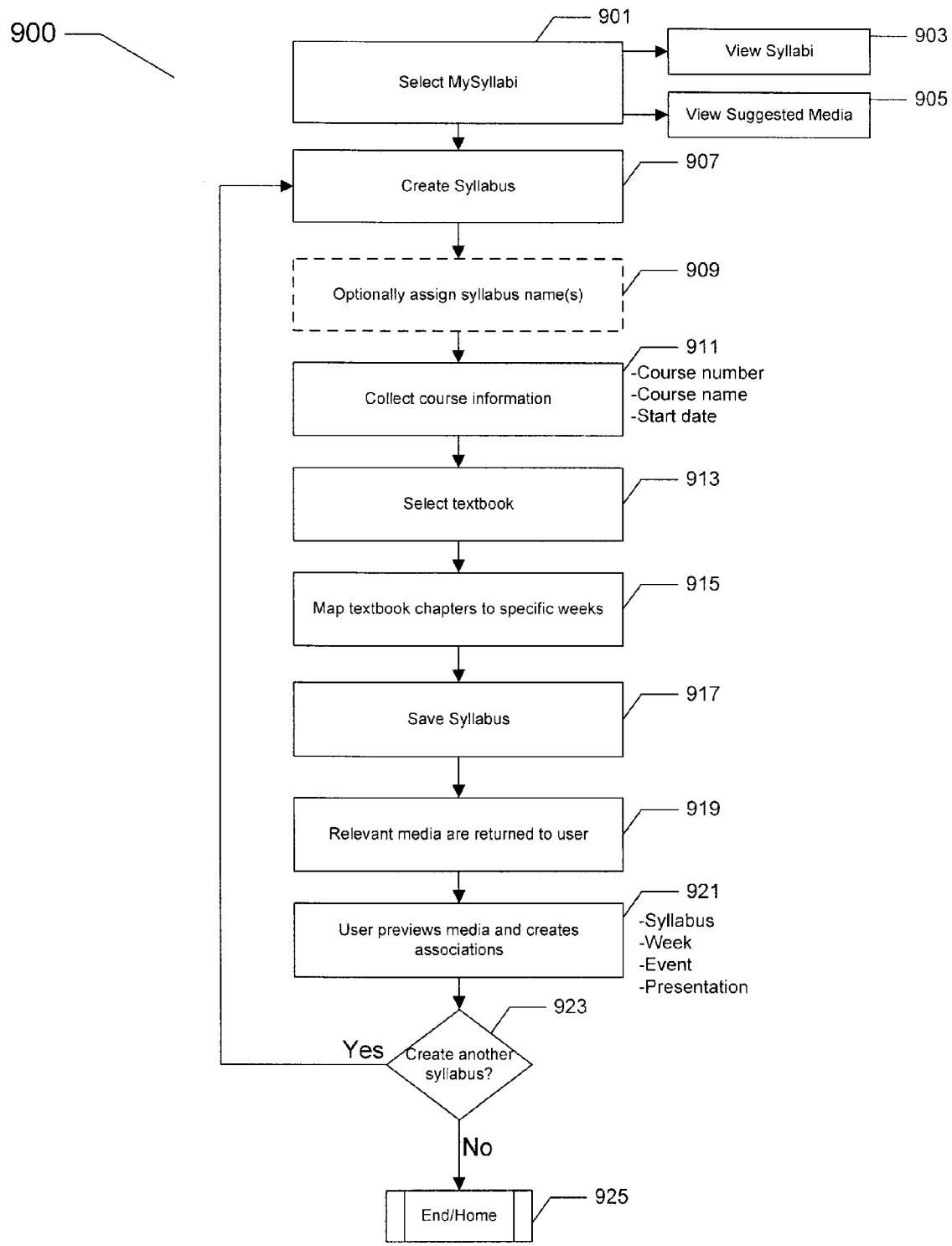
FIG. 9 is a flowchart depicting the syllabus creation routine of the present invention.
Figure 10:
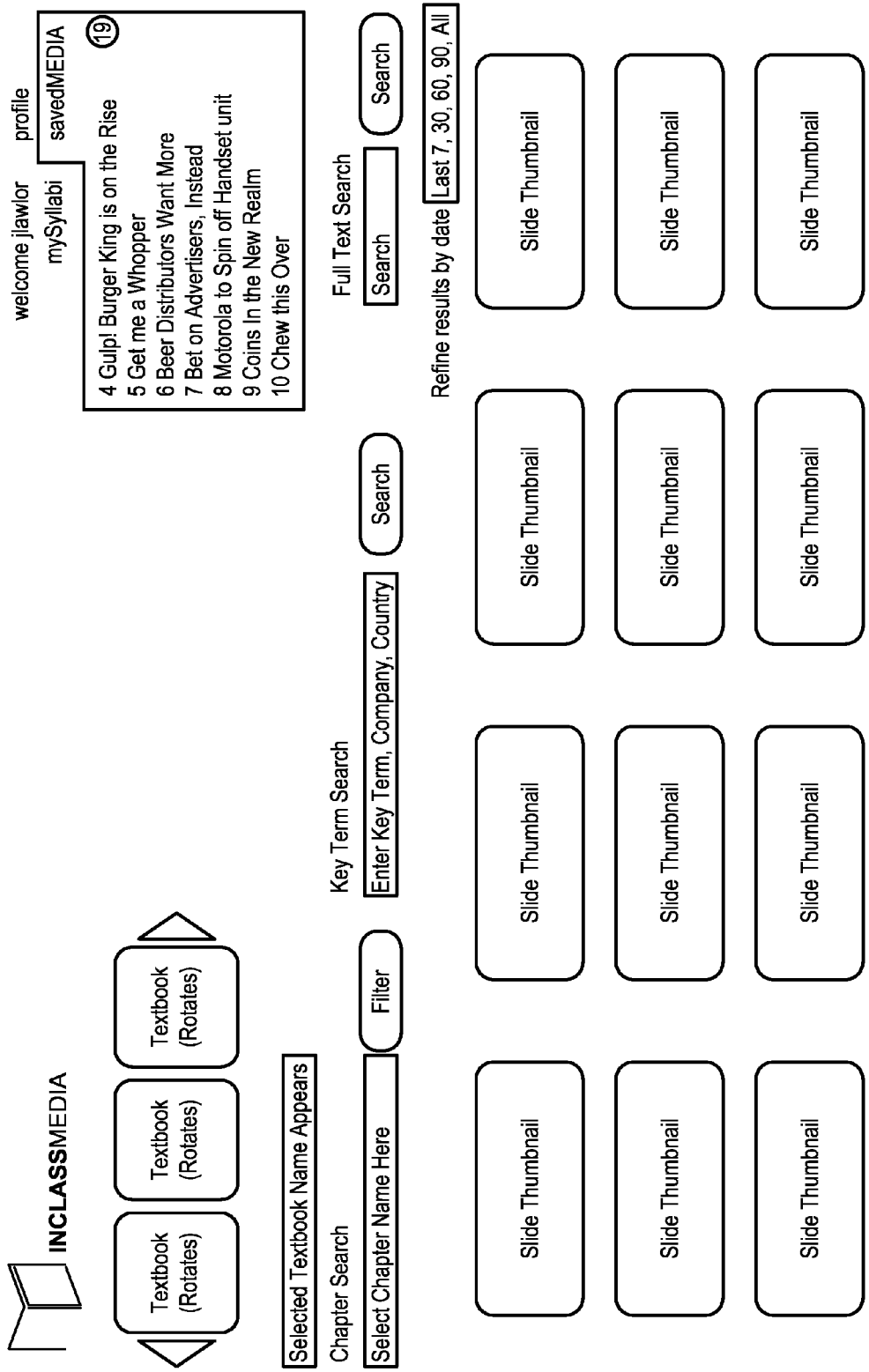
FIGS. 10-17 are various exemplary screenshots of the present invention.
Figure 11:
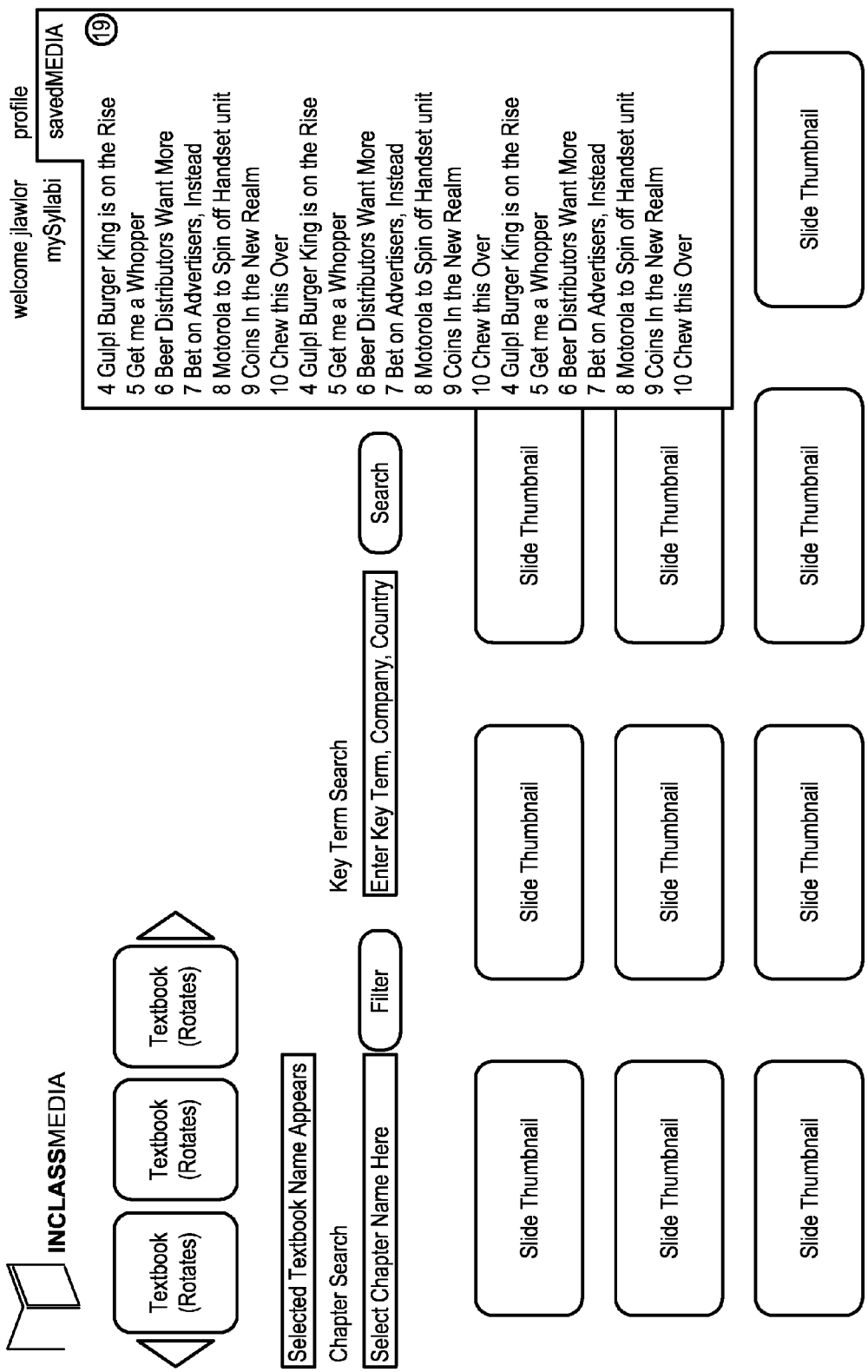
Figure 12:
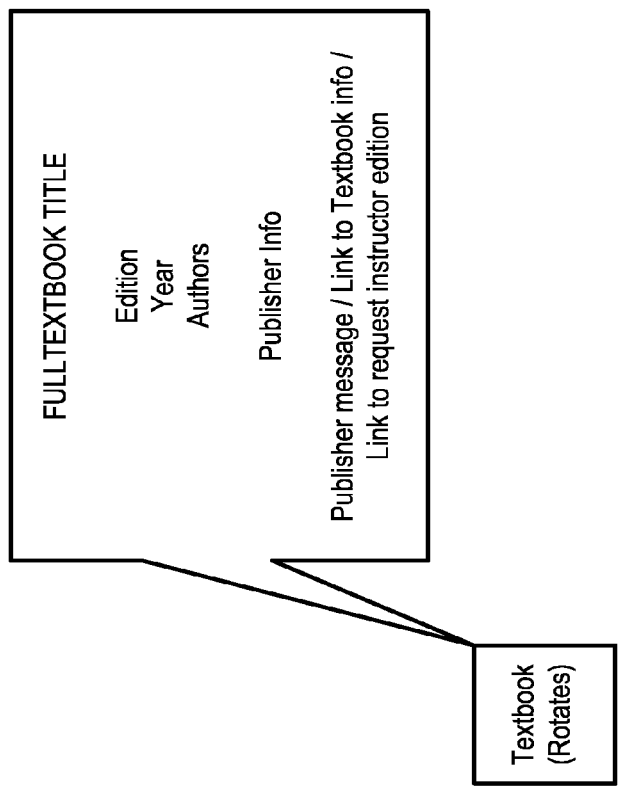
Figure 13:
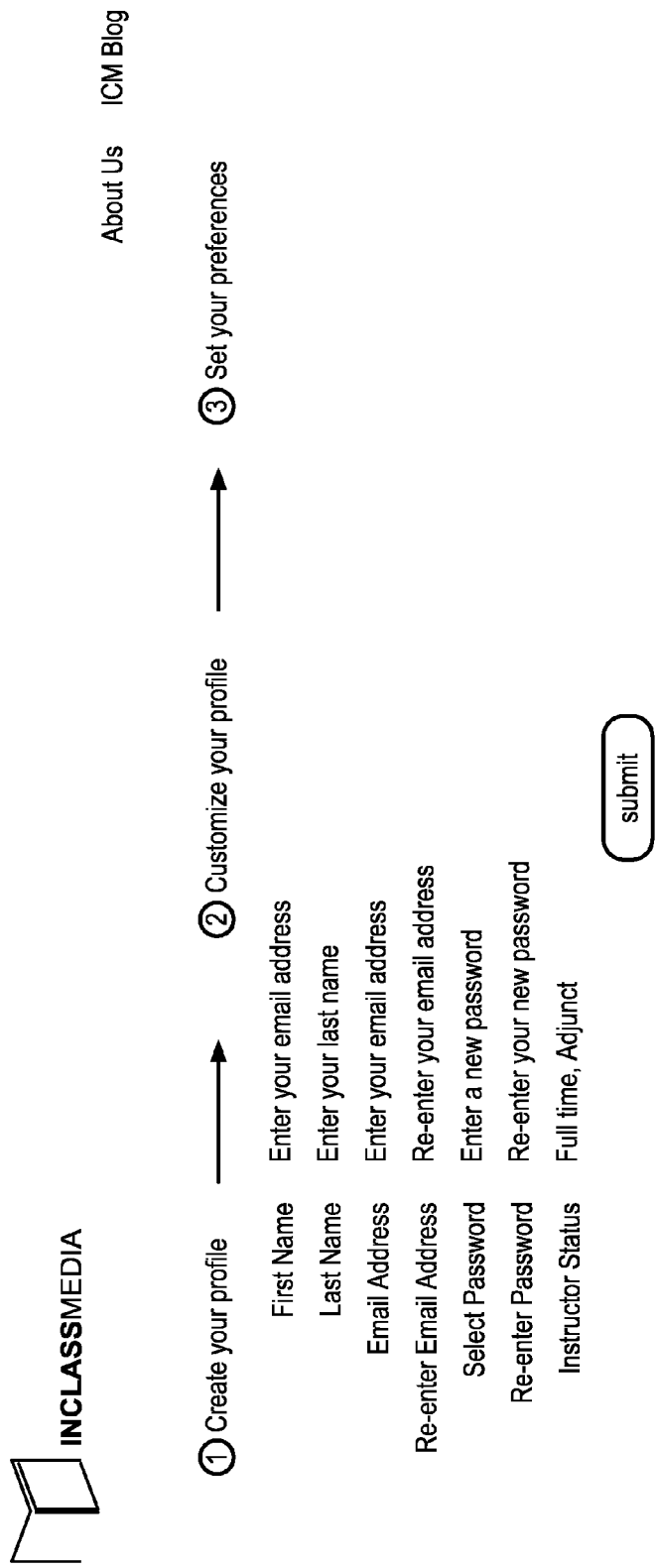
Figure 14:
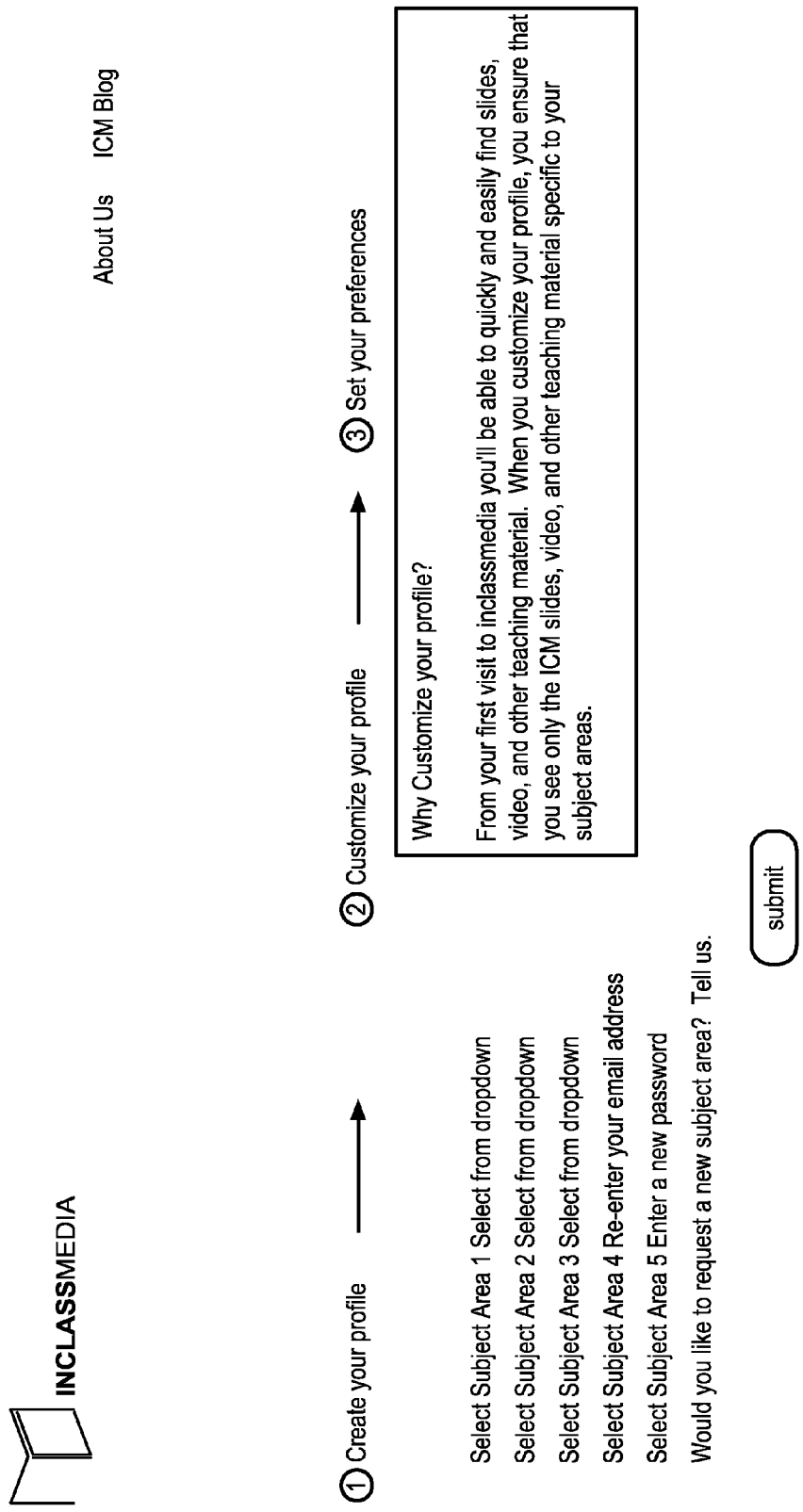
Figure 15:
Figure 15:
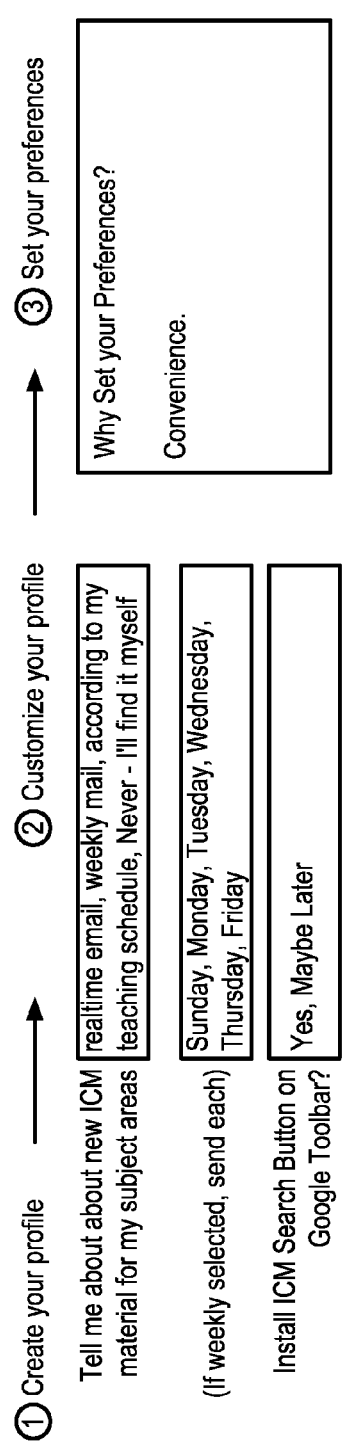
Figure 16:
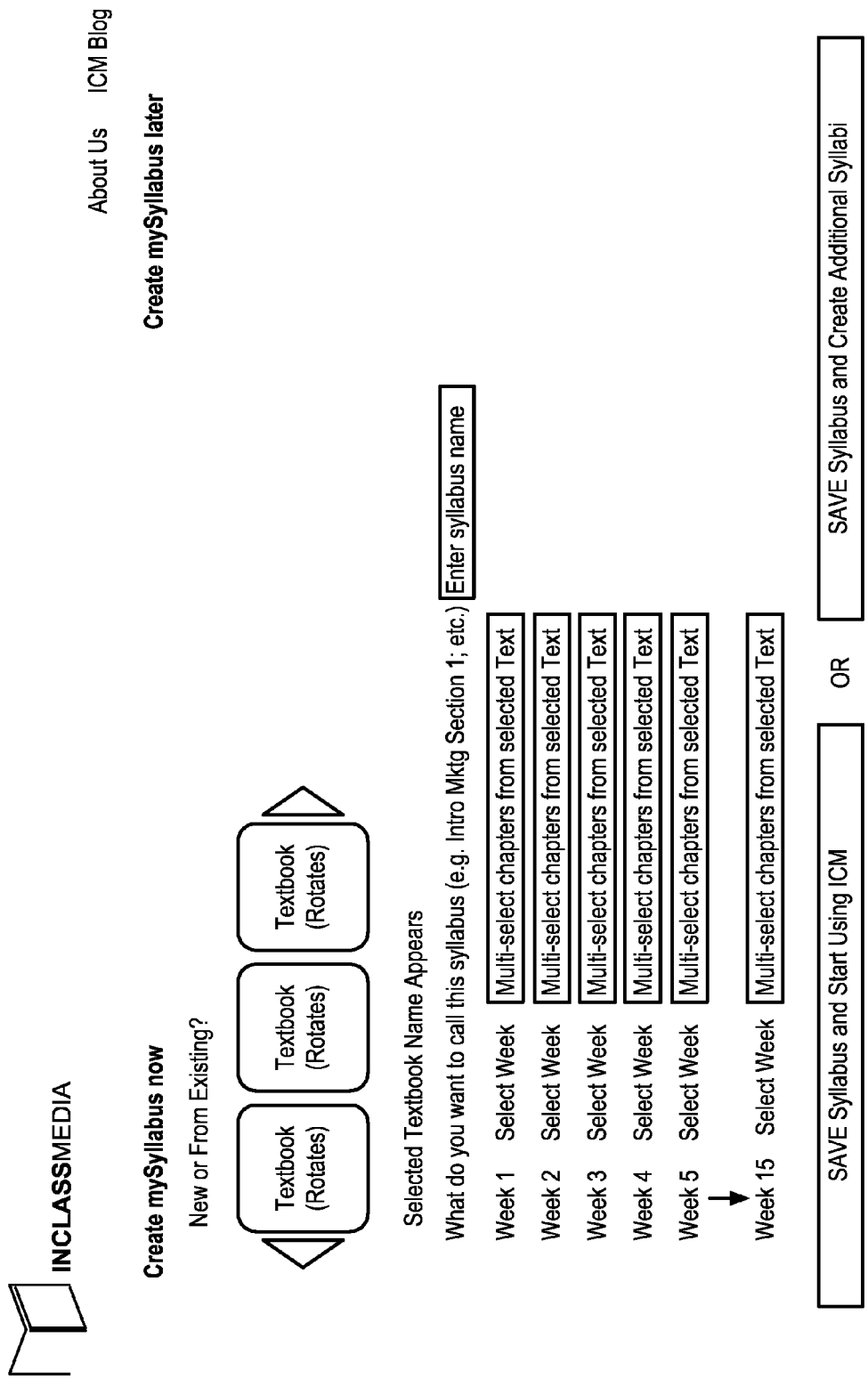
Figure 17:
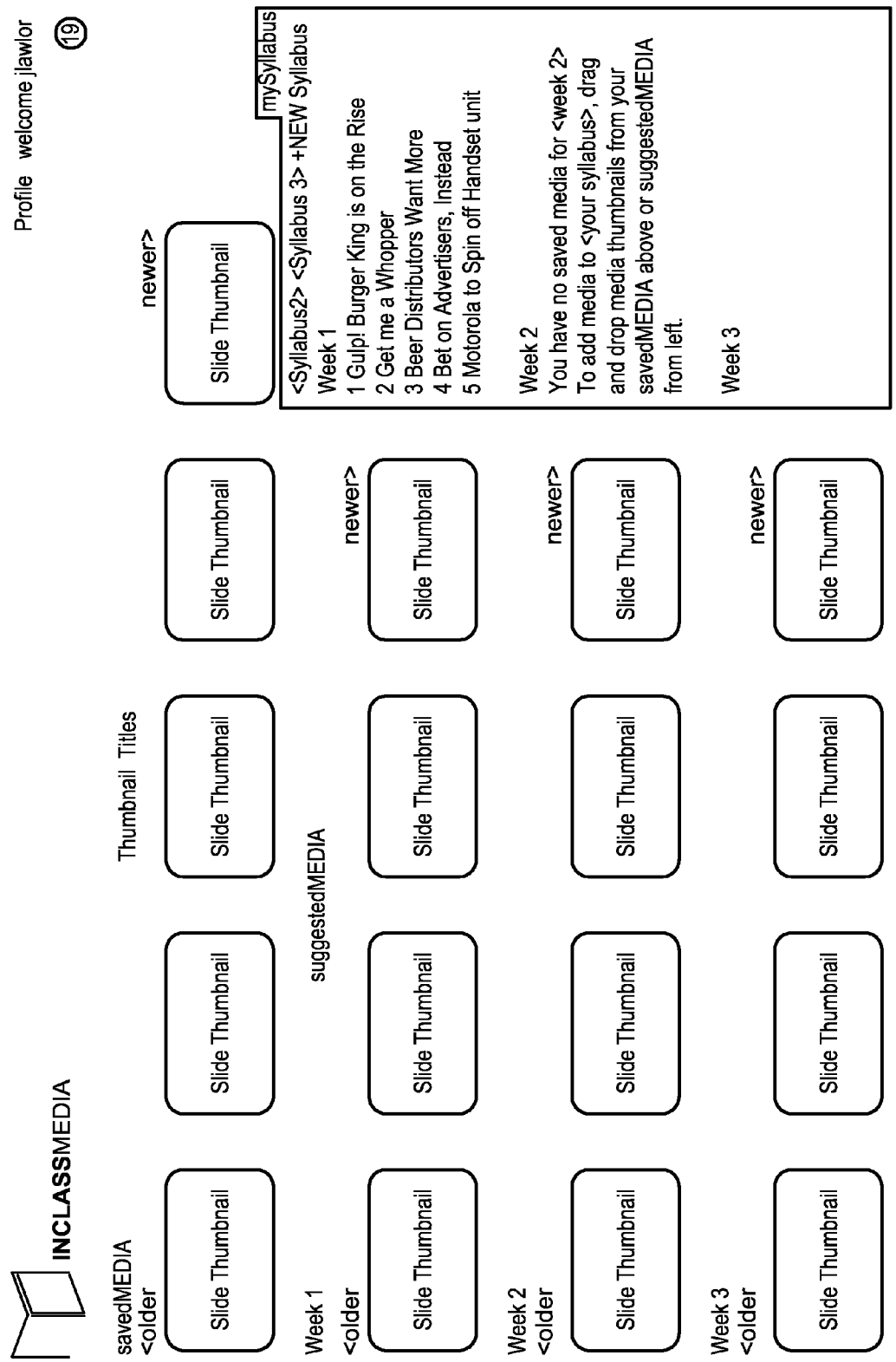

Referring now to FIG. 9, a flowchart depicting the syllabus creation routine of the present invention is shown. As previously described by way of FIG. 3, the MySyllabi functionality allows users to map their selected textbook and chapters to specific weeks of the course, with the application then returning suggested media for review or playback in specific weeks of the course.

When a user selects the MySyllabi functionality, they can either view syllabi that currently exists in step 903, view suggested media in step 905 that is provided by the application, or elect to create a dynamic syllabus in step 907. If they elect to create a syllabus in step 907, the user can optionally assign syllabus name(s) 909. The application then collects course information in step 911 such as the course number, course name, and start date. The user then selects the textbook they plan to use in step 913, and then the user maps textbook chapters to specific weeks in step 915, and saves the syllabus they have created in step 917. In step 919, media relevant to the course are returned to the user, and the user previews the media in step 921 and creates associations between the media and the syllabus, as well as other variables such as week, event, presentation, and the like. In step 923, if the user elects to create another syllabus, they are returned to step 907. Should they not elect to create another syllabus, the routine is ended and they may return home in step 925.

Lastly, to provide a complete understanding of the present invention and the various embodiments described herein, FIGS. 10-17 are various exemplary screenshots of the present invention. These exemplary screenshots are not intended to be limiting in any way, but rather, are intended to provide examples of one embodiment of the present invention that, when taken with this specification and the remaining drawings, will provide one skilled in the art with an adequate understanding of the present invention such the present invention and its various embodiments can be made and used.

It is, therefore, apparent that there has been provided, in accordance with the various objects of the present invention, a computer based system and method for the creation and access of dynamic course content and associated media products.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims, and the attached drawings.

What is claimed is:

1. A computer-based system for the creation and access of dynamic timely course content comprising:
   a computer having a processor, memory, and access to computer readable media;
   a computer program stored on computer readable media configured to correlate electronic textbook structure data with dynamic timely media products stored on computer readable media;
   a user interface displayed on a computer monitor configured to interact with said computer program whereas the user interface comprises a display of electronic textbook structure data correlated to dynamic timely media products;
   a database of textbook structure data and course concepts stored on computer readable media and operatively coupled to said computer program;
   at least one dynamic current content electronic news source received from a computer network and stored on computer readable media that is used in the creation of said dynamic timely media products; and
   a search utility stored on computer readable media;
   whereas the search utility allows a user to select the dynamic timely media product created from the dynamic current content news source while viewing the electronic textbook structure data correlated to dynamic timely media products.

2. The system of claim 1, wherein the correlation of electronic textbook structure data with dynamic timely media products is displayed on a computer monitor using key words.

3. The system of claim 1, further comprising slides stored on computer readable media operatively coupled to textbook structure data.

4. The system of claim 1, further comprising videos stored on computer readable media operatively coupled to textbook structure data.

5. The system of claim 1, further comprising a network connection.

6. The system of claim 1, further comprising a save/mark media function stored on computer readable media.

7. The system of claim 6, wherein the save/mark media function has previewing capabilities.

8. The system of claim 1, further comprising a download utility stored on computer readable media.

9. The system of claim 1, further comprising a MySyllabi function stored on computer readable media.

10. The system of claim 1, further comprising key terms data stored on computer readable media.

11. The system of claim 1, further comprising a live classroom use function stored on computer readable media.

12. The system of claim 11, wherein the live classroom use function has web based real time playback of selected media.

13. The system of claim 1, wherein the media products are business news.

14. The system of claim 1, wherein the media products are electronic media.

15. The system of claim 1, wherein the search utility performs full text searching.

16. A method for the creation and access of dynamic timely course content, the method comprising the steps of:

provinding with a computer electronic textbook structure data to a user;

correlating using a computer program stored on computer readable media electronic textbook structure data with dynamic timely media products stored on computer readable media;

displaying on a computer monitor a user interlace configured to interact with said computer program whereas the user interface comprises a display of electronic textbook structure data correlated to dynamic timely media products;

operatively coupling a database of textbook structure data and course concepts stored on computer readable media to said computer program;

receiving from a computer network at least one dynamic current content electronic news source and storing the at least one dynamic current content electronic news source on computer readable media;

creating dynamic timely media products from the at least one dynamic current content electronic news source; and selecting with a search utility stored on computer readable media a dynamic timely media product created from the dynamic current content news source while viewing the electronic textbook structure data correlated to dynamic timely media products.

\* \* \* \* \*